(12) United States Patent
Gilzean et al.

(10) Patent No.: US 8,494,136 B2
(45) Date of Patent: Jul. 23, 2013

(54) SYSTEMS AND ARRANGEMENTS FOR COMMUNICATING WITH AN AUTOMATED INTERACTIVE TELECOMMUNICATIONS SERVICE SYSTEM

(75) Inventors: Candice B. Gilzean, Austin, TX (US); Gahlya Gregory, Bowling Green, KY (US); Fabian F. Morgan, Austin, TX (US); Angie B. Pelt, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1297 days.

(21) Appl. No.: 11/768,141

(22) Filed: Jun. 25, 2007

(65) Prior Publication Data
US 2008/0317239 A1  Dec. 25, 2008

(51) Int. Cl.
*H04M 3/42* (2006.01)
*H04M 1/64* (2006.01)

(52) U.S. Cl.
USPC ............. 379/201.01; 379/88.01; 379/88.23; 379/201.03; 379/216.01

(58) Field of Classification Search
USPC ............. 379/201.01, 88.23, 216.01, 88.01, 379/201.03; 715/241; 709/202; 705/79
See application file for complete search history.

(56) References Cited

U.S. PATENT DOCUMENTS

| 5,835,571 | A | 11/1998 | Johnson | |
|---|---|---|---|---|
| 5,912,669 | A | 6/1999 | Hsia | |
| 5,974,443 | A * | 10/1999 | Jeske | 709/202 |
| 6,378,234 | B1 | 4/2002 | Luo | |
| 6,952,597 | B2 | 10/2005 | Graham et al. | |
| 6,980,200 | B2 | 12/2005 | Goren | |
| 7,065,188 | B1 * | 6/2006 | Mei et al. | 379/88.23 |
| 2007/0255662 | A1 * | 11/2007 | Tumminaro | 705/79 |
| 2008/0184106 | A1 * | 7/2008 | Tischer et al. | 715/241 |

OTHER PUBLICATIONS

"Avaya 5410 Digital Telephone" http://www.pcrush.com/prodspec.asp?ln=4&itemno=82332&bsrc=4ldbb, 2006.
"Spectrum Plus(tm) Series User's Guide, Single Line Caller ID Speakerphone Telephone Model SP550)" http://www.oit.duke.edu/televid/basicservice/SP550.pdf (See p. 25), 2006.

* cited by examiner

*Primary Examiner* — Thjuan K Addy
(74) *Attorney, Agent, or Firm* — Matthew F. Mottice; Mark Vallone (57) ABSTRACT

In embodiments, a method, device and/or system allowing for automatic connection through a menu driven communication system by way of a keyed sequence, which may be stored as an XML file, comprising a telephone number and a menu response sequence.

10 Claims, 4 Drawing Sheets

SYSTEMS AND ARRANGEMENTS FOR COMMUNICATING WITH AN AUTOMATED INTERACTIVE TELECOMMUNICATIONS SERVICE SYSTEM

FIELD OF INVENTION

The present invention is in the field of telecommunications and, in particular, to arrangements for communicating with, and transacting with an automated interactive telecommunications system.

BACKGROUND

Many consumers utilize a telephone to interface with an automated interactive telecommunications service system (AITSS) to get information, pay bills and gain access to various services. AITSS's are called many things such as menu driven phone systems, automated operators, automated tellers, and virtual operators. AITSS's are ubiquitous and can provide services to many industries such as the banking, shopping, travel, marketing, polling gaming and stock market industry. Accordingly AITSS's, or automated systems for short, can perform many tasks such as facilitating payments, making money transfers, providing balance information, making reservations, and facilitating the purchase of goods. Often consumers will call the same service provider every month to accomplish a task. In this case, an automated service user will repeatedly key in the same information, albeit on weekly or monthly intervals. After a user dials a ten digit number, an automated system can accept user input in the form of dual tone multi-frequency inputs. A reply to such inputs and interaction with an automated system could be described as follows;

---

1) Press 1 for English. Marke Numero Dos Para Espanol
2) <User Presses 1>
3) For residential accounts, press 1. For commercial accounts, press 2.
4) <User Presses 1>
5) For billing questions, press 1. To hear the current status of your account, press 2. To pay current bill, press 3. To speak to a customer service representative, press 4.
6) <User Presses 3>
7) Press 1 if you know your account number. Otherwise press 2.
8) <User Presses 1>
9) Please enter your account number, followed by the pound sign.
10) <User Enters Acct # possibly sixteen keystrokes>
11) Your current balance is $50, due on May 5, 2007. Press 1 to pay by check. Press 2 to pay by credit card.
12) <User Presses 2>
13) Please enter your credit card number.
14) <User Enters Credit Card # usually sixteen digits>
15) Please enter your credit card expiration date.
16) <User Enter Exp. Date>
17) Your payment has been accepted. Thank you, goodbye.

---

It can be appreciated that over forty keystrokes are required to accomplish such a transaction. The user may need to key in the same information above every month, or even more frequently such as in bi-weekly, etc. Missing one keystroke often requires a user to start the keying process over from the beginning. Further, on a phone it can be tough to position the phone for listening to a reply, then reposition the phone such that the key pad can be seen to press a key and then return the hand set to the user's ear such that the next command can be heard. Such a process can be very time consuming when many keystrokes must be entered. It would be beneficial if there were arrangements that can eliminate having to repeatedly key in the same information when interacting with an automated system.

SUMMARY OF THE INVENTION

The problems identified above are generally addressed by systems, methods and media for automating access to services provided by automated interactive telecommunication systems or a virtual operator. Virtual operator type systems typically ask questions and request a keystroke response and a user can navigate through a menu driven system to get desired information or accomplish a specific task. Virtual operator systems are often utilized by credit card companies and banks because such businesses can run a lot more efficiently using a computer controlled virtual operator as opposed to a human operator or teller.

Embodiments disclosed herein include a method for accessing and interacting with a virtual operator to obtain a service. The method can include activating a programming mode and entering a plurality of keystrokes to create a keyed sequence. The keyed sequence can include a telephone number and a menu response sequence. The menu response sequence can control a menu driven communication system such as a virtual operator after a user device is connected to the virtual operator via a telecommunications network. The keyed sequence can include delays between each keystroke. The delays can be recorded, and a session identifier can also be recorded. The keyed sequence can be associated with the delays and the session identifier when the device is in the programming mode.

In another embodiment, a communication device or system is disclosed that can automatically connect with a virtual operator and drive the menu of the virtual operator to accomplish a specific task or obtain a specific result. The system can include an input output module to receive a keyed sequence from a user, where the keyed sequence represents a telephone number and a menu response sequence. The keyed sequence can also include delays between individual entries (keystrokes) of the keyed sequence. The system can also include a converter to convert the keyed sequence and the delays into a storable format. In one embodiment the keyed sequence can be stored in an extensible markup language (XML) format. This allows for a standard format to transfer data between devices that support the XML language.

The system can also include memory coupled to the converter to store the keyed sequence and the delays. A transmitter can be included to transmit the keyed sequence to the virtual operator system, and a receiver can be utilized to receive a result from the virtual operator system. The system may utilize a graphical user interface module coupled to the input output module to display statuses and allow for a user driven menus to be utilized. The graphical user interface can facilitate receiving the keyed sequence and can facilitate selecting the keyed sequence to be transmitted to the virtual operator system. The system can also include a voice recognition module to provide command recognition from the user and provide a speech to text conversion for information provided by the virtual operator such that a virtual operator's utterance can be displayed in text to the user.

Another disclosed embodiment provides a machine-accessible medium containing instructions effective, when executing in a data processing system, to cause the system to perform a series of operations for automating the interaction between a telephone and a virtual operator. Thus, the instructions when executed can manage communications between a mobile telephone and a server based virtual operator and can provide a result from such communications. When the instructions are executed by a machine they can cause the machine to perform operations including activating a programming mode and entering a plurality of keystrokes to create a keyed sequence.

The keyed sequence can include a telephone number and a menu response sequence, where the menu response sequence can control a menu driven or interactive communication system. The keyed sequence can include delays between each keystroke. The instructions can cause the machine to record the delays and record a session identifier and then associate the keyed sequence with the delays and the session identifier when the system is in the programming mode.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims.

In one embodiment, an automated telecommunications service acquisition device is disclosed. The device can provide improved features possibly by just adding software or changing the software in a "smartphone." The disclosed arrangements allow a user to create, store, and share data created by user input. The data can include a keystroke pattern having individual delays between the keystroke inputs and can include a title for the keystroke session. Selection by the title on a graphical user interface can automatically retransmit the keystroke pattern with the delays as the device can access information/and or complete a transaction.

Figure 1:
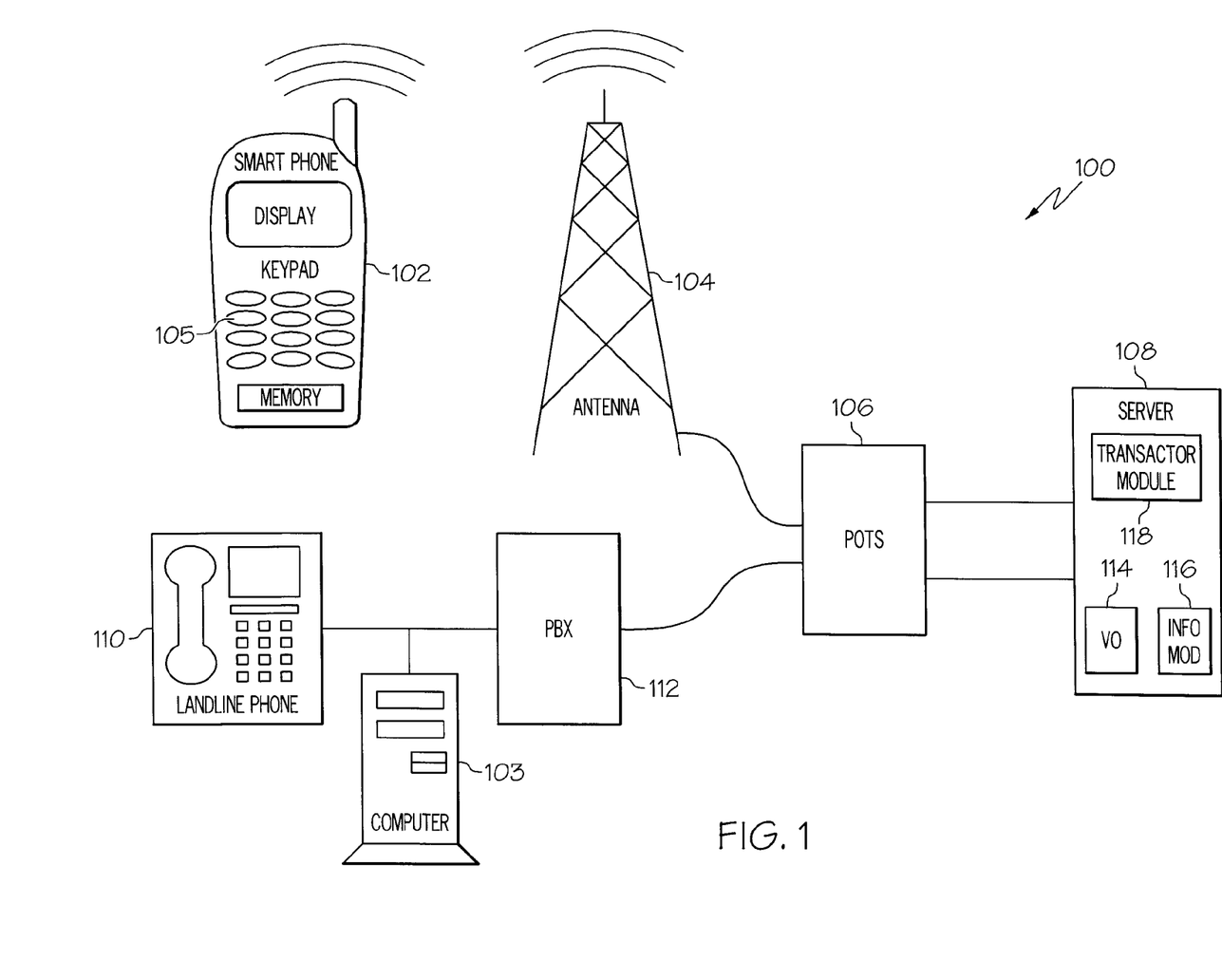
FIG. 1 depicts an environment for telecommunication with a communication device such as a smart phone according to one embodiment.

Referring to FIG. 1 a telecommunications system 100 is illustrated. The system 100 can include a communication device 102 such as a mobile "smart" phone, a land line phone 110, a computer 103, a private branch exchange (PBX) 112, an antenna 104, a plain old telephone system (POTS) 106 and a server 108. In operation, the communication device 102 can communicate over a wireless link to antenna 104. Antenna 104 can be part of many wireless systems or architectures such as a cellular type system, a satellite based third generation long term evolution (3G LTE), or standards based on institute of electrical and electronic engineers (IEEE) 802.11 specification for WIFI, WiMax. In addition other industry standards such as digital video broadcasting for handheld (DVB-H), mobile broadband wireless access (MBWA), code division multiple access 2000 (CDMA2000) and universal mobile telecommunications system UMTS could be utilized to provide communications for the system.

The antenna 104 can connect to a plain old telephone system 106 and the plain old telephone system can connect into a server 108. Server 108 can operate an automated interactive telecommunications service system such that communication device 102 can access services from server 108. Landline phone 110 can interconnect with server 108 via the PBX 112 and POTS 106.

It can be appreciated that many consumers or users call the same service provider or server 108 every month to accomplish a task. In this case, an automated service user will repeatedly key in the same information, or enter the same key pattern into a communication device (i.e. 102 and 110) albeit on weekly or monthly intervals. In accordance with the present disclosure, if a user wants to "re-use" a keystroke pattern at a later date to drive an automated service system, the user can command the phone or communication device (102 or 110) to store a keystroke pattern. To start such a recording session, the communication device (102 or 110) can be placed into a recording mode, and the device 102 or 110 can record keystroke entries and the various delays associated with each keystroke entry. The keystroke entries can be divided into many parts such as a phone number sequence and a menu response sequence. A menu response sequence can further be divided into a password sequences and navigation sequences.

Alternatively, a user can choose to start recording keystrokes after a dial tone is detected, after some form of an existing "connection" is detected or after a phone number is dialed. When a communication device (102 or 110) is connected with the automated system in server 108, the communication device (102 or 110) can record menu response sequence keystrokes and time delays in between the key stokes. In one embodiment the communication device 102 can store digital representations of the dual tone multi-frequency (DTMF) sequence created by the keystrokes where the sequence is recorded based on real-time, time delays. If the sequence was unsuccessful in acquiring the desired service or was unsuccessful in communicating with the server the recording session could be aborted or not saved.

Server 108 can include virtual operator 114 to drive a menu, transactor 118 to manage transactions, and information module 116 to provide information. In one embodiment, prior to a user entering a keystroke sequence to access and manipulate the virtual operator 114, the user can select a record mode for the device 102 and the memory in the communication device 102 can record or store the key strokes and the delays between the keystrokes. During the keystroke sequence, the user can manually interact with the virtual operator 114 by entering keystrokes using keypad 105 and access virtual operator 114 and information module 116 or data base via the system 100. The virtual operator 114 can be a menu driven system that provides access to information 116 and facilitates transactions with transactor 118.

After a successful session with the virtual operator 114, the user can store the keystroke session and title the session by entering a textual title that identifies something about the keystroke pattern such as "Get bank balance." In another example, if a minimum payment was made on a Visa bill the keystroke sequence could be titled "Pay Visa Bill/minimum pmt." As can be appreciated, these are only examples what services are available and how the user can conduct transactions, title transactions and store such sessions. It can also be appreciated that many different types of services are available via a telecommunications system 100.

When a keystroke recording sequence is completed, or the communication device 102 is disconnected from the system, the communication device 102 can stop recording the keystrokes, and can prompt the user if he/she would like to save the "key strokes"/data entry session. If a user chooses yes, possibly by entering another keystroke, the user can be prompted for a title and the title and the recorded key stroke information can be associated with the session and be saved into memory. The storage of this data in memory could be performed locally. In one embodiment the phone number keystroke entries could come from an existing "speed-dialing system."

The virtual operator 114 can include any automated answering system, including automated operator, automated teller, and menu driven service provider and such a system can facilitate payments, make money transfers, make reservations, cancel reservations, or provide information such as flight times, gates, balance information, and determine when payments are due to name a few. Such information and services are only limited by the virtual operator capabilities or system capabilities and the keystroke interaction provided by the user.

In one embodiment, the communication device 102 can convert the keystroke pattern into a standard or universal computer format or language such as an extensible markup language (XML). XML allows information and services to be encoded with meaningful structure and semantics that computers and humans can understand. An XML format can be utilized for information exchange generally, and can easily be extended to include user-specified and industry-specified tags.

Server 108 and computer 103 could store then provide "canned" or pre-programmed XML code to communication devices 102 and 110 such that all or, the majority of manual entry of the keystrokes by a user of a communication device 102 could be avoided. For example password and account numbers could be added to the base code. Server 108 could also support a website to facilitate storage of the XML code and XML conversion software to provide "shareware" or information to any willing user. Thus, XML or other formats could be exchanged between computer 103 and communication devices 102 and 110 via a wired network or a wireless network and computer 103 could be utilized to back up data on the communication device 102. Also computer could be utilized to create the keyed sequence and the delays. Computer 103 could also act as a communication device and access virtual operator 114 and retrieve information from information module 116 or conduct transactions with transaction module 118.

In another embodiment, service providers or companies such as a bank, Visa, Mastercard or a utility company could offer a web page with downloadable XML based keystroke data. Accordingly, a user could download such code over the Internet and these key stroke patterns could be customized by the consumer and then utilized. For example, the XML code could provide an easy way to enter account information and passwords that are customized for each consumer/user.

The illustration below provides a sample XML based keystroke and how XML data could be utilized to store a keystroke pattern. This XML file format may be presented as follows:

```
<keyStrokePattern id="Pay Bill XYZ">
<connectionNumber>123-456-7890</connectionNumber>
<timeDelay>5 seconds</timeDelay>
<buttonPress id="1"/>
<timeDelay>3 seconds</timeDelay>
<buttonPress id="1"/>
```

-continued

```
<timeDelay>7 seconds</timeDelay>
<buttonPress id="3"/>
<timeDelay>3 seconds</timeDelay>
<buttonPress id="1"/>
<timeDelay>3 seconds</timeDelay>
<parameter>
<id>AccountNumber</id>
<description>What is your account number?</description>
</parameter>
<timeDelay>5 seconds</timeDelay>
<buttonPress id="2"/>
<timeDelay>3 seconds</timeDelay>
<parameter>
<id>CreditCardNumber</id>
<description>What is your credit card number?</description>
</parameter>
<timeDelay>3 seconds</timeDelay>
<parameter>
<id>CreditCardExpDate</id>
<description>What is your credit card expiration date?</description>
</parameter>
</keyStrokePattern>
```

Memory in the device 102 could store the above XML program where the program can include a phone number, delays and associated user data.

Figure 2:
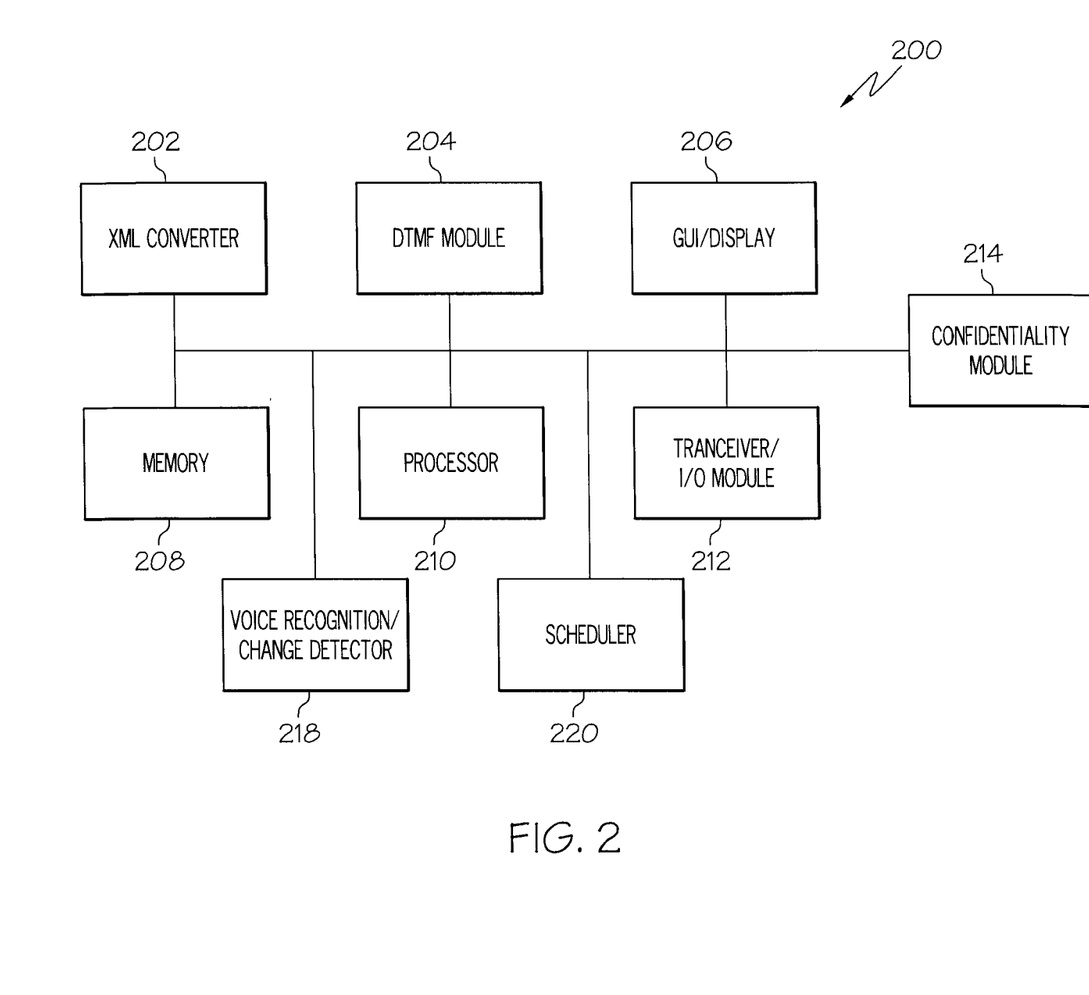
FIG. 2 is a block diagram of one embodiment of a communication device suitable for interacting with an automated interactive telecommunications service system.

Referring to FIG. 2, a block diagram of a communication device 200 that can provide "autodial and virtual operator manipulations" is disclosed. The device 200 can include a processor 210, memory 208, a transceiver-input output (I/O) module 212, voice recognition module 218, a graphical user interface (GUI) 206, a dual tone multi frequency (DTMF) generator 204, and a DTMF to XML converter 202. In one embodiment, the device memory 208 can contain executable instructions and the processor 210 can execute the instructions to accept and store manual user keystrokes as the user is interfacing with an automated telecommunications service system.

The GUI/display module 206 could be a keypad and a display or a touch sensitive liquid crystal display. The display module 206 could be driven by a graphical user interface (GUI) 206 that provides menu driven selections and can prompt a user for different inputs at various stages of a process by providing different menus at the various stages of the process. In response to keystrokes, the GUI 206 could prompt a user if the keystrokes should be stored. In response to user approval, the keystroke pattern can be stored in the memory 208 and the GUI 206 can prompt the user for a title for the keystroke sequence. The title can be associated with the keystroke sequence (a phone number and menu driver) and the delays between the keystrokes.

Thus, after a keystroke pattern is stored, a user can select a title and the communication device 200 can automatically communicate with an automated service system to get a particular service or particular results. It can be appreciated that after the dial-up/service request is started, the user will not have to enter a single keystroke and can just listen to the responses of automated system. In one embodiment, the device 200 can detect verbal replies of the automated system at various steps and extract information from utterances by the system and convert the utterances to text using the voice recognition module 218. Thus, voice recognition module 218 can convert a received verbal input to text, and memory 208 can store the resulting textual data. This allows the session to take place without requiring the user to listen to the session in real time, further allowing the user to get results of a session at his or her convenience anytime after completion of a session. In another embodiment, an analog to digital converter allows memory 208 to store the verbal results of a session for later retrieval.

Accordingly, a user can prompt the device 200, via the graphical user interface 206, for information that was previously retrieved by the device and call up the results of a session that occurred previously (possibly a scheduled session) to minimize the time required to get updated data or session results from a service provider. As discussed above, when a user wants to access automated services the phone number can be automatically dialed and the menu can be automatically driven using stored keystroke patterns and the result(s) can be automatically stored to minimize user effort.

Often, interactions with an automated system require passwords and such confidential information can be stored in, or under the control of confidentiality module 214. Confidential information can include for example, passwords and account numbers. Such information can receive specialized treatment and thus, confidentiality module 214 can provide specialized treatment such as encryption and password protection for sensitive or confidential information. The information managed by confidentiality module 214 could be stored in memory 208 as a sub-set of memory 208 that is "parameterized."

Accordingly, if the communication device 200 falls in the possession of an unauthorized user, the unauthorized user would not be able to use the interactive system and could be prohibited from accessing the confidential information. Many other security features could also be provided by confidentiality module 214 such as key lock. Other security features that could be provided by the confidentiality module 214 include disabling the ability to share keystroke patterns with others or other devices. Another function that the confidentiality module could provide can include is voice recognition in order allow activation of the keystroke sequence, so that only the users voice, and not an unauthorized voice, can activate the sequence. The confidentiality module 214 could also detect an SMS command or e-mail command from a user and based on such a command the confidential key strokes patterns should be erased from the device. A user could also interface with the confidentiality module 214 to create and change password(s). For example, the entire saved keystroke pattern data may be secured with a password such that a password is required in order to transmit or receive or share a keystroke pattern.

Possibly all of the keyed sequence or possibly just the confidential portion of the keyed sequence could be parameterized. For example, after a user places the device 200 into a record mode, the transceiver-I/O module 212 can receive keystroke patterns and the module 212 can prompt the user for what portion(s) of the keystroke pattern contain confidential information and will require parameterization by the confidentiality module 214. Thus, in one embodiment only a portion of the keystroke pattern can be treated as confidential. In another embodiment voice recognition/change detector module 218 can receive voice commands from either the user or the automated service system. Accordingly, the device 200 could respond to a user voice command to control the functions of the device 200. Alternately the voice recognition module 218 can recognize responses from the virtual operator such as "The menu has changed," or "Your balance is 1,023.34 dollars" and textually or verbally notify the user of the received information and can notify the user what was received.

In another embodiment, detection of a menu change could automatically set the device 200 into a record mode to record the user's new input. At the end of the new input session, the user could again be prompted to see if the user would like to replace the old version of keystrokes with the newly recorded one. Thus, new/revised keystrokes could be associated with an existing or stored session/activity. Additionally, the user could be prompted to update "duplicate" sessions stored by other users on other devices who share, utilize or have previously shared keyed sequences. Thus, a community of users would not all have to edit the session due to the updated menu.

In operation, the keyed input can be converted into a DTMF format by DTMF module 204. Also, in a recall mode the keyed sequence stored in memory 208 can be converted to a DTMF format by DTMF module 204 before being transmitted by transceiver-I/O module 212. In one embodiment, the XML converter 202 can convert the keyed sequence, possibly provided in a DTMF format, into an XML language.

In another embodiment, the user could invoke a command via the transceiver-I/O module 212 to export the keystroke pattern (entered data) into an XML format and the XML converter 202 could convert the DTMF and delays between keystrokes into an XML format. XML could be utilized as a data format to store and transport the key stroke pattern data. An XML format can allow the user to have the option to store this code or even post/store this XML code on a website for backup purposes in case the communication device 200 was lost or stolen. In addition, a website can allow a user to share keystroke data with other users, via a network and other communication technology including wireless technology such as Bluetooth technology.

Scheduler 220 can allow a user to schedule the activation of automated sessions for future dates. Thus, a user can create a schedule to invoke a session a specific time every day, every week or every month or just for a one time occurrence. The results of the session can be stored in memory 208 and displayed to the user via the graphical user interface 206. The results can be automatically displayed or displayed upon request and a "last updated" time and date that a session was conducted can be provided with the displayed results.

Figure 3:
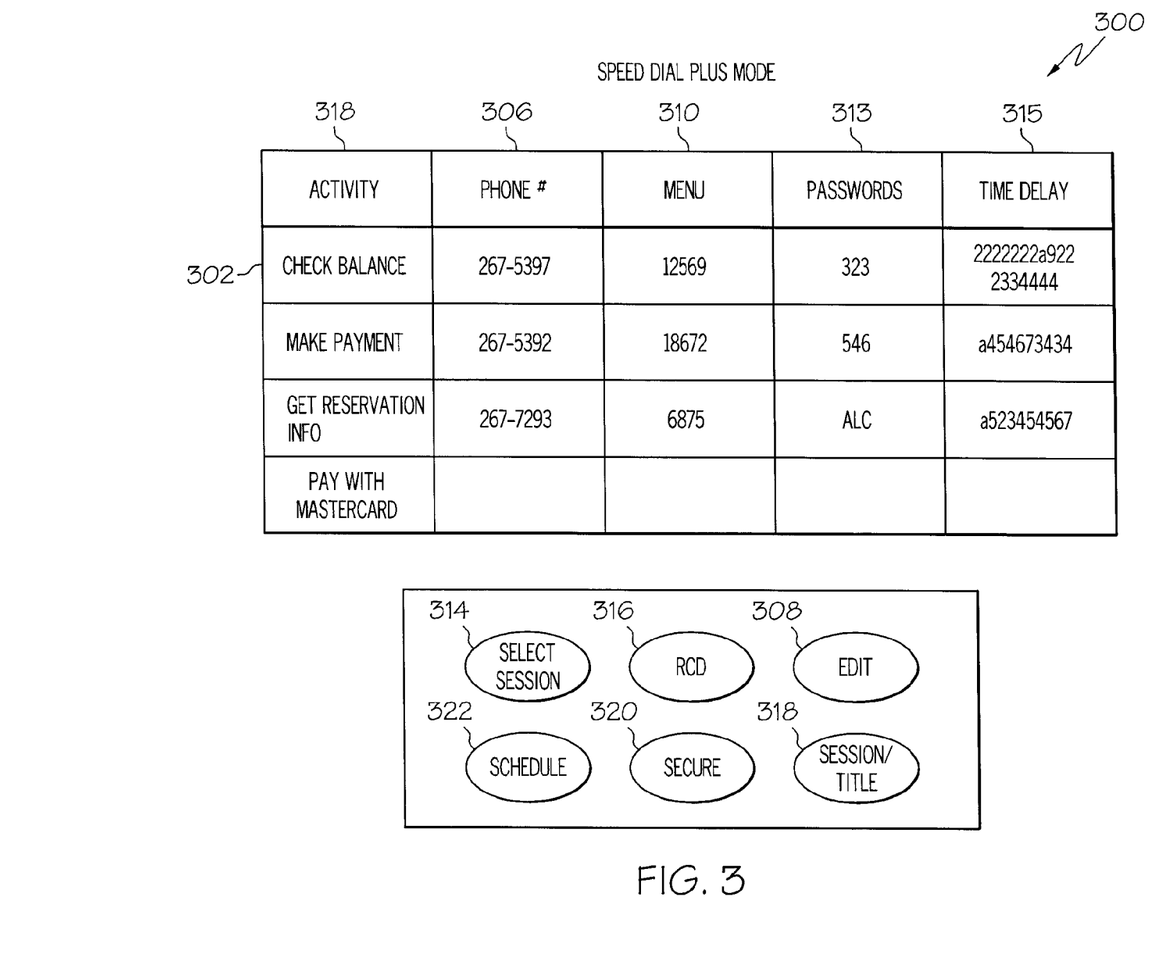
FIG. 3 depicts a conceptual illustration of a graphical user interface for the telecommunication device.

Referring to FIG. 3, a graphical user interface (GUI) 300 that can facilitate connecting with and controlling a telecommunications service system is disclosed. The GUI 300 can be configured in a table form having headings; session identifier/activity 318, phone #306, menu 310, passwords 313 and time delays 315. The GUI 300 can also have many specialized selectable buttons and with a touch screen the buttons can change for each step of a process. The selectable buttons illustrated include a select session button 314, schedule activation button 322, secure data button 320, record button 316, session title button 318 and edit session data button 308.

Generally, select session button 314 can be utilized to activate a session such as check bank balance 302. Schedule activation button 322, can allow a user to schedule future sessions and schedule the activation of sessions on a reoccurring or periodic basis. Secure data button 320 can be utilized to highlight and encrypt specific data such as password data as illustrated under the heading passwords 313. Record button 316 can be utilized to initiate a record a session or to confirm a record session if a user has input a keyed sequence into the device. Session/title button 318 can be utilized to title an entered or stored keystroke sequence before, during or after the keyed sequence is entered. Edit session data button 308 can be utilized to activate an edit session to modify an existing record already stored in the system.

In one embodiment, the user can place a cursor or pointing device over titled activities such as check bank balance 302 and in response to an input, the system can auto dial, connect with the service system and control the service system using the displayed configuration (i.e. phone number 306, menu drivers (a keystroke pattern) passwords 313 and time delays between keystrokes 315 in the columns that correspond to the selected session identifier-activity).

In one embodiment, a user can select the schedule button 322 and schedule a specific time every day, week or month for a specific activity or session to take place. The results of the session can be stored and displayed to the user. The results can be automatically displayed or displayed upon request and a "last updated" time and date can be provided with the displayed results. Thus, for example a user can be provided with a bank balance or can receive updated status information on a periodic basis without even entering an individual request for such information.

In another embodiment a user can activate a service session by selecting the select service button 314. This could activate a highlighted or selected activity and can invoke a command to communicate with the service provider system. When a user wants to record a session, the user can select the record button 316. In a record mode, the user can manually communicate with the service system and the communication device can record keystrokes and the time delay between keystrokes. Thus, when a user dials a phone number and navigates through a menu driven system, the key strokes and the associated delays can be recorded by the device. In one embodiment, multiple key pattern entries can be associated with a single phone number having a single session title. Thus, a user may associate a label/title or activity with a keystroke sequence shown on one of the rows of the GUI 300, such that more than one recorded keystroke sequence could be associated with the same phone number.

Activities or titles such as "Pay Bill ABC" and "Pay Bill XYZ" could be associated with the phone number 123-456-7890, and the menu can have a different keystroke sequence. Moreover, the user may optionally include a password in password column 313 for additional protection of the saved keystroke session.

The user can also title sessions by selecting the title button 318 and entering keystrokes to generate alpha characters for the session identifier column 318. In the illustrated embodiment "Get Reservation Info" has been entered as session identifier text to identify an activity for the device to conduct. As stated above, the GUI function and key sequence entry may be created on the communication device or on a computer. Alternately, the entry can download the keystroke sequence in an XML format via the telecommunications service system.

In one embodiment, to receive a service, or start a session, the user can scroll through a list of activities or a phone list title containing auto-dialable numbers using a graphical user interface 300. From the list, the user can select previously saved keystroke sessions, either by selecting an activity or the associated phone number they wish to dial. Upon activation of the saved protocol, the device can dial the phone number and drive the menu of the service system. Accordingly, when the call is connected, the device can automatically replay the recorded key strokes, with the associated time delays.

In another embodiment, when the user presses any key during the replay of recorded key strokes, the replay can be automatically stopped. This gives the user the option of manually interrupting or overriding the stored sequence and manually modifying the sequence when desired. In other embodiments, the user could associate the session with a recorded voice label, such as "Pay Light Bill." Thus, the user could provide a voice command to replay a previously saved session by uttering the words <Pay Light Bill> and the device could recognize the voice command and proceed to transmit the saved keystroke sequence associated with the voice activated command.

If the user activates a number, an optional feature can be to alert the user either visually or audibly that the user has one or more saved sessions associated with that number, and prompt the user which session the user would like to invoke. This feature could also be set up as a preference setting.

In other embodiments, the user could remove/updated or edit data entries by selecting the edit button 308. In yet another embodiment, before saving a recorded keystroke sequence the user could be allowed to confirm the entry. This could be accomplished by replaying (visually or audibly) the user entered data and prompting the user for approval. In another embodiment the device could record the entire session in audio and overlay the voice command of the automated system with the keystrokes that were entered.

In another embodiment, the user can create, then share key stroke pattern with other devices. Such a procedure can be achieved utilizing the following steps. The user can select a previously saved key stroke session, either by selecting the associated phone number to which the session applies, or can select the session identifier label that identifies the session. The user can then invoke a command in the device such as share and the device can create a shareable file format based on selected session.

In a further embodiment, a visual display of the recorded session can be displayed on the user interface of the device. For example, for the interaction described in the background section, the display shown would be: 1,1,3,1,<Acct#>, 2, <CreditCard#>, <CreditCardExpDate> (note that real values could be supplied for <Acct#>, <CreditCard#>, and <CreditCardExpDate>).

When security is an issue, the device can allow key pattern data such as a social security number, pin numbers and the like to be secured by activating secure button 320. Thus, a user can be given the option to identify, then secure or parameterize private information on the GUI 300. Thus, the system can obfuscate specific information on the screen and limit access to the information. In one embodiment, private information could be <Acct#>, <CreditCard#>, and <CreditCardExpDate>. The user could parameterize this information by activating the secure button 320 and highlighting and selecting the requisite sequence of digits on the GUI 300. This secure or parameterization command could require a description of the data, which could be entered via the telephone keypad. For example, for the <Acct#> parameter, the description could be "What is your account number?" In addition, when an XML based keystroke pattern is downloaded from a company, or received from someone who has shared the pattern, the device could prompt the user to supply parameter values, then the device can store the parameters (instead of storing parameter questions, such as "What is your account number?").

In one embodiment methods for selecting and/or changing menu choices is provided by selecting the edit button 308. It can be appreciated that from time to time, menu options change. To handle changes that occur in an automated/menu driven phone/operator system, the device could detect a verbal phrase or a revision date provide by the virtual operator. For example, the device could have a small subset of a voice recognition system that could identify the phrase "options have changed" or "menu has changed." Such a recognition system could be implemented utilizing available speech-recognition technology.

Upon such detection during a replay or activation of a saved session, the user could be prompted by the device that new pattern data may be needed and allow the user to update the stored key stroke pattern data. Furthermore, the GUI 300 of the device could display a list of persons/devices/group that the pattern has been shared with/provided to, and the GUI 300 can prompt the user to update other databases with the new data/new pattern. Optionally, the device could send out a short message service (SMS) message or email to these persons, and have the pattern updated via this communication.

In yet another embodiment, a user can "share" or communicate key stroke pattern with another consumer/user. For example, one resident in a housing subdivision may wish to share his/her stored sequence for paying the electric bill with a neighbor, since the neighbor would most likely be using the same menu response sequences (albeit altered) using the device. The disclosed arrangements can automate sharing of session data utilizing a wireless technology and the single activation of a sharing command can invoke an algorithm of detecting a sharing device and exchanging information.

In yet another embodiment, a product infomercial hotline can provide details about a new product, where in order to access information about the product requires the input of a certain key sequence over the phone system. The key sequence data can be masked and not made directly available for viewing by the user. Thus, nobody except the creators of the hotline may know the key sequence. The key sequence can be transferred to users via a wireless communication such as Bluetooth, InfraRed technology, or over other available networking technologies, such as e-mail. The communication with the keyed sequence can have incentives such that the person(s) that distributes the advertisement with the code to the users can get credits.

Thus, in pyramid type marketing organizations the origin of the contact with a client can be automatically tracked. For example, when code is distributed to someone, when the call is made, an identifier associated with the person that generated the lead/sent the code, and the number of the person that made the phone call can automatically be included in the transmission, along with other special codes. The code could be encrypted, such that users cannot view it. Also, the marketing company could seed individuals at certain places around the country/globe, and then have them try to share the marketing information with as many people as possible. This embodiment could be utilized as a marketing tool and could help build brand recognition for the company/product.

The disclosed arrangements can allow a user to translate recorded key sequences into XML and vice-versa, for easy downloading from company websites from device to device. For example from personal digital assistant to personal digital assistant etc. The XML format can facilitate sharing of the information between many different types of devices. The ability to provide or identify parameters or user-specific customization of a portion of the keystroke sequences allows sharing of the keystroke data to occur without compromising confidential information, such as account numbers, personal identification number's, etc. The device can recognize that an input is required to access or display such data and the device could prompt the user to supply such a password.

In another embodiment a business method incorporating the use of the shared key sequences in an encrypted form. Automatic triggering of stored keyed sequences can be transmitted once the call is connected, instead of manually having to push a button to replay the programmed key strokes. In one embodiment, a method to translate dual tone multiple frequency (DTMF) to and from Extensible Markup Language XML is disclosed. Such a conversion can be offered as a service by companies and this DTMF-XML conversion code can be downloadable via the Internet. XML is an industry standard format for data exchange, and phone manufacturers can translate internal proprietary data formats such that they can communicate utilizing standard XML format. Thus, phone manufacturers can convert XML to and from their proprietary data format or proprietary mechanism.

The present disclosure also can provide usability enhancements for notification of modified sequences from the server-side. These enhancements will allow vendors or service providers to notify users when an updated key stroke sequence is available to download. When a user downloads the XML keystroke sequence from a website, the user can optionally enter information such as a cellular telephone number or email address for service provider to notify the subscriber if the automated telecommunication sequence gets updated.

In one embodiment a notification to cell phone can be made as a short messaging service (SMS) message, where the receipt of a specially formatted message can indicate to the enhanced phone software to prompt user to download new sequence from a universal resource locator (URL) address. In another embodiment the server can generate an automated call where the selection of a menu item on the communication device, (for example pressing a button 1) will indicate to the processor to go to a specific URL address and download a new sequence. In yet another embodiment if notification by email address was selected, and user reads email from smartphone, then the reading of a specially formatted email address will indicate to the enhanced phone software to prompt user to go to included URL address and download new sequence.

Likewise, enhancements can be provided for the client-side notification for modified sequences. When it is detected that an automated telecommunication service sequence has changed, then after the sequence is modified, the user can be prompted to see a list of persons the original sequence was shared with by the user so that they can notify them of the change. As discussed above the changes can be conveyed via email, SMS message, or generated automated call and these conveyances could be generated automatically via a processor in the SDP device. The changed can be detected via an automated menu from the server-side notification of updated changes, or by manual update by the user, or by another source such as a group user if the user has shared the sequence with someone.

This embodiment can be differentiated from the server-side method because the process for the sender phone can keep a list of unique identifiers (ID's) for all the receivers of a specific sequence that was shared by the users. The storage of these receiver unique ID's can be configurable by the user, such that a user can choose to configure the process. The unique ID's can be determined by the profile or choice of the receiver such that when a receiver receives a sequence over Bluetooth (or other wireless capability), the enhanced software on receiver phone can determine or prompt a user about what method the user would like to utilize for notification of changes to the system. For example, the user could choose to update the sequence via SMS, email or a generated call. Alternatively, the receiver can set this up once in their profile, and it could apply to all sequences received.

The receiver could also send this notification choice back to the sender, in an ACK message, for example and the sender can associate this notification as the unique ID corresponding to a particular sequence. If the information has already been stored in the sender's phone, such as the email address being under the receiver's contact name, then the process would only need to have a pointer to this data, and not actually have to duplicate it's saving and this feature could reduce the amount of memory required.

In another embodiment a client-side method for securing shareable keystrokes is disclosed. The method can include entering a PIN in order to activate a stored keystroke and encrypting just the portion of the keystroke that is sensitive information, such as parameterized account number or PIN, etc. Alternatively, the whole saved sequence can be encrypted. A voice detection system can be utilized to activate a stored keystroke. If the phone gets lost or stolen the owner/user can send a command to the device via SMS, or special sequence after calling (this would need to be coordinated with cell phone service provider) that causes all keystroke sequences with sensitive information to be deleted (can delete the whole keystroke, or just the sensitive portion). The portion of data that is sensitive can be denoted with a special XML attribute, such as "confidential='yes'".

If the phone received such an SMS command or special calling sequence, then if the unauthorized individual tries to share the sequence with someone, the transfer can be rejected by the device on the receiver side, because the transfer could indicate that the "real" owner has invalidated all sequences. In one embodiment a method for securing shareable keystrokes on the server side is disclosed. If the phone gets lost or stolen, the system can change operation when the device is in possession of an unauthorized user because for example the user would probably not want an unauthorized user to invoke payment of mortgage multiple times in a week. According to the present disclosure a user can go to website of the company and enter identification information (i.e. cell phone number and a PIN) and invoke a command to block/discard any automated payments from phone that was lost (based on phone number in caller id).

To reduce the amount of effort to cancel or deactivate such communications for multiple companies (and a user may forget to alert a certain company), a third-party service could be developed that manages the companies of all sequences downloaded by the user. With this service, the user could only be required to tell the service to invalidate the phone number, and the service would be responsible for contacting the individual companies.

Figure 4:
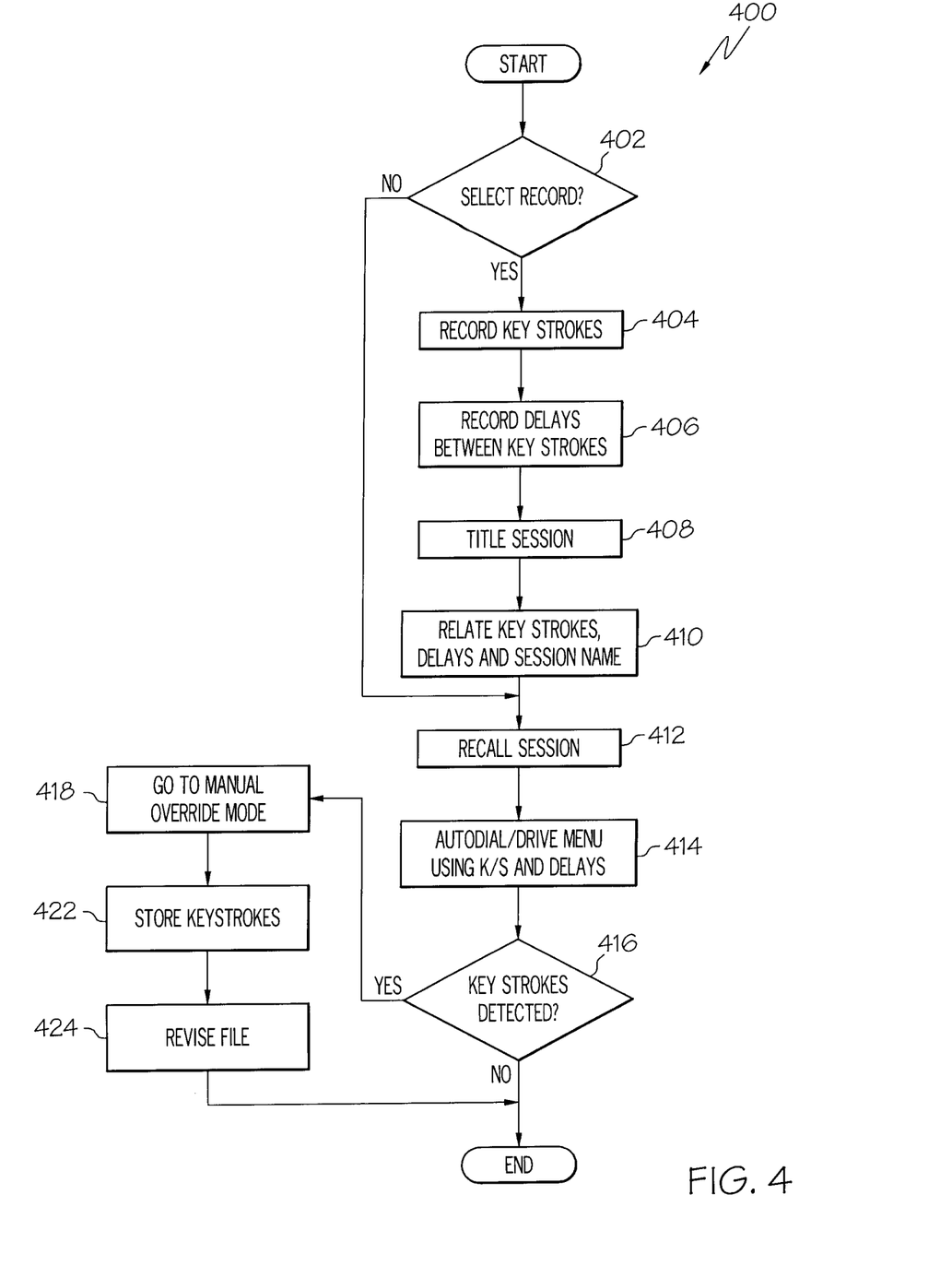
FIG. 4 is a flow diagram illustrating a method for communicating and transacting with an automated interactive telecommunication service system.

Referring to FIG. 4 a flow diagram illustrating a method of configuring and operating a device that can interact with an automated interactive telecommunications service system is disclosed. As illustrated by decision block 402, it can be determined if a user has placed the device in a record mode. If the device has not been placed in a record mode then the process can proceed to block 412. When the device has been placed into a record mode, the keystrokes made by a user can be recorded, as illustrated by block 404. The device can also record the time delays between the keystrokes and code the delays in a digital format such that the delay times can be stored as illustrated by block 406.

The user can be prompted for a title to the session and the user input can be stored as illustrated by block 408. As illustrated by block 410, the device can relate or associate the key stroke data with delay data and the title or session name as illustrated by block 410. As illustrated by block 412 when keystroke entry sessions are stored by the device a user can recall a session. This can be accomplished by displaying session titles on a touch screen and when the user contacts the selectable session title on the display the device can autodial a phone number and drive a menu of a telecommunication system using the stored keystrokes and delays to obtain specific results.

During this procedure, the device can detect whether keystrokes have been received as illustrated by decision block 416. If no keystrokes have been received then the process can store results of the session and the process can end. If keystrokes have been detected, then the system can go into a manual override mode as illustrated by block 418. The detected keystrokes can be stored as illustrated in block 422 and the file that contains the session information can be revised as illustrated in block 424. The process can end thereafter.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Each software program described herein may be operated on any type of computer, such as personal computer, server, etc. Any programs may be contained on a variety of data storage media. Illustrative data storage media include, but are not limited to: (i) non-writable storage media (e.g., read-only memory devices within a computer such as CD-ROM disks readable by a CD-ROM drive); and (ii) writable storage media (e.g., floppy disks within a diskette drive or hard-disk drive) data storage media, when storing computer-readable instructions that direct the functions of the present invention, represent embodiments of the present invention.

It will be apparent to those skilled in the art having the benefit of this disclosure that the present invention contemplates methods, systems, and media for detecting fraudulent behavior during an e-commerce (Internet commerce) session. It is understood that the form of the invention shown and described in the detailed description and the drawings are to be taken merely as examples. It is intended that the following claims be interpreted broadly to embrace all the variations of the example embodiments disclosed.

What is claimed is:

1. A method comprising:
receiving, by a communications device, commands that cause activation of a programming mode of said communications device;
receiving, by said communications device, a plurality of keystrokes to create a keyed sequence, said keyed sequence including a telephone number, a menu response sequence and delay data representing time delays between the plurality of keystrokes;
assigning, by said communications device, a session identifier to said keyed sequence; and
storing, by said communications device, said session identified keyed sequence in a standard computer file format, accessible via a telecommunications network.

2. The method of claim 1, further comprising sharing or communicating by said communications device said session identified keyed sequence.

3. The method of claim 1, wherein said telecommunications network is the Internet.

4. The method of claim 1, wherein said standard computer file format is extensible markup language (XML) file format.

5. The method of claim 2, further comprising accepting by said communications device a command to parameterize confidential data before sharing the keystroke sequence.

6. A computer program comprising:
a computer-readable tangible storage device;

program instructions, stored on the storage device, to receive, by a communications device, commands that cause activation of a programming mode of said communications device;

program instructions, stored on the storage device, to receive, by said communications device, a plurality of keystrokes to create a keyed sequence, said keyed sequence including a telephone number, a menu response sequence and delay data representing time delays between the plurality of keystrokes;

program instructions, stored on the storage device, to assign, by said communications device, a session identifier to said keyed sequence; and program instructions, stored on the storage device, to store, by said communications device, said session identified keyed sequence in a standard computer file format, accessible via a telecommunications network.

7. The computer program product of claim 6, further comprising:

program instructions, stored on the storage device, to detect a change indicator in a menu driven communication system; and program instructions, stored on the storage device, to provide an indicator that at least a portion of a menu in the menu driven communication system has changed.

8. The computer program product of claim 6, wherein said standard computer file format is extensible markup language (XML) file format.

9. The computer program product of claim 6, wherein said communications device is a mobile smart phone.

10. The method of claim 1 wherein said communications device is a mobile smart phone.

\* \* \* \* \*